United States Patent
Colja et al.

(10) Patent No.: US 9,184,598 B2
(45) Date of Patent: Nov. 10, 2015

(54) SIGNAL DISCRIMINATION FOR WIRELESS KEY FOBS AND INTERACTING SYSTEMS

(71) Applicant: Leggett & Platt Canada Co., Halifax (CA)

(72) Inventors: Renato Colja, Windsor (CA); Milosz Niec, Tecumseh (CA); Jiang Zhao, Windsor (CA); Xinde Liang, Windsor (CA)

(73) Assignee: LEGGETT & PLATT CANADA CO., Halifax, Nova Scotia (CA)

( * ) Notice: Subject to any disclaimer, the term of this patent is extended or adjusted under 35 U.S.C. 154(b) by 0 days.

(21) Appl. No.: 13/658,492

(22) Filed: Oct. 23, 2012

(65) Prior Publication Data

US 2013/0110318 A1    May 2, 2013

Related U.S. Application Data

(60) Provisional application No. 61/551,687, filed on Oct. 26, 2011, provisional application No. 61/570,586, filed on Dec. 14, 2011.

(51) Int. Cl.
  *G06F 17/00* (2006.01)
  *H02J 5/00* (2006.01)

(52) U.S. Cl.
  CPC .......... *H02J 5/005* (2013.01); *E05Y 2900/531* (2013.01)

(58) Field of Classification Search
  CPC ........ B60K 1/04; B60K 6/28; B60K 2001/04; B60W 2520/10; B60W 20/00; B60W 10/06; B60W 10/08; B62M 6/90; B62M 1/105; Y02T 10/7005; Y02T 10/705; Y02T 10/7088; Y02T 10/6286; H02J 5/005; E05Y 2900/531

USPC ................ 701/69, 2; 280/212, 215; 320/104; 903/903, 907, 960

See application file for complete search history.

(56) References Cited

U.S. PATENT DOCUMENTS 8,204,649 B2 *  6/2012  Zhou et al. ...................... 701/36
8,368,352 B2 *  2/2013  Ichikawa et al. .............. 320/109

(Continued)

FOREIGN PATENT DOCUMENTS

CA   2487594       5/2005
JP   H11-168837    6/1999

(Continued)

OTHER PUBLICATIONS

International Search Report and Written Opinion for Application No. PCT/CA2012/000985 dated Jan. 31, 2013 (8 pages).

(Continued)

*Primary Examiner* — Mary Cheung
*Assistant Examiner* — Atul Trivedi
(74) *Attorney, Agent, or Firm* — Michael Best & Friedrich LLP

(57) ABSTRACT

A wireless charging system for a vehicle. The system includes a wireless power transmitter, a detector device associated with the wireless power transmitter, and a controller operatively associated with the wireless power transmitter. The controller senses whether a vehicle control signal is present using the detector device, stops transmission of electromagnetic energy from the wireless power transmitter to a receiving device if a vehicle control signal is present, and resumes transmission of electromagnetic energy from the wireless power transmitter to the receiving device after a predetermined period of time.

20 Claims, 12 Drawing Sheets

(56) References Cited

U.S. PATENT DOCUMENTS

| | | | |
|---|---|---|---|
| 8,466,654 B2* | 6/2013 | Cook et al. | 320/109 |
| 8,482,250 B2* | 7/2013 | Soar | 320/109 |
| 8,884,581 B2* | 11/2014 | Widmer et al. | 320/108 |
| 2004/0267501 A1* | 12/2004 | Freed et al. | 702/184 |
| 2005/0046584 A1* | 3/2005 | Breed | 340/825.72 |
| 2006/0255943 A1* | 11/2006 | Hougen et al. | 340/572.1 |
| 2009/0015202 A1* | 1/2009 | Miura | 320/132 |
| 2009/0045773 A1* | 2/2009 | Pandya et al. | 320/108 |
| 2009/0058361 A1* | 3/2009 | John | 320/128 |
| 2009/0125172 A1* | 5/2009 | Matsubara | 701/22 |
| 2009/0189564 A1* | 7/2009 | Vasilantone | 320/108 |
| 2009/0212626 A1* | 8/2009 | Snyder et al. | 307/10.1 |
| 2010/0109445 A1* | 5/2010 | Kurs et al. | 307/104 |
| 2010/0164297 A1* | 7/2010 | Kurs et al. | 307/104 |
| 2010/0171368 A1* | 7/2010 | Schatz et al. | 307/104 |
| 2010/0201203 A1* | 8/2010 | Schatz et al. | 307/104 |
| 2010/0259110 A1* | 10/2010 | Kurs et al. | 307/104 |
| 2010/0264747 A1* | 10/2010 | Hall et al. | 307/104 |
| 2010/0277121 A1* | 11/2010 | Hall et al. | 320/108 |
| 2010/0289331 A1* | 11/2010 | Shionoiri et al. | 307/9.1 |
| 2010/0301810 A1* | 12/2010 | Biondo et al. | 320/155 |
| 2010/0324765 A1* | 12/2010 | Iida et al. | 701/22 |
| 2011/0043165 A1* | 2/2011 | Kinser et al. | 320/109 |
| 2011/0115431 A1* | 5/2011 | Dunworth et al. | 320/108 |
| 2011/0144823 A1* | 6/2011 | Muller et al. | 700/297 |
| 2011/0221384 A1* | 9/2011 | Scheucher | 320/101 |
| 2011/0291615 A1* | 12/2011 | Pandya et al. | 320/108 |
| 2011/0302078 A1* | 12/2011 | Failing | 705/39 |
| 2013/0335020 A1* | 12/2013 | Moore | 320/109 |

FOREIGN PATENT DOCUMENTS

| | | |
|---|---|---|
| JP | 2008-131812 | 6/2008 |
| JP | 2008-206297 | 9/2008 |
| JP | 2009-148108 | 7/2009 |
| JP | 2010-093957 | 4/2010 |
| WO | 2012082858 | 6/2012 |

OTHER PUBLICATIONS

European Search Report and Written Opinion for Application No. 12844051.8 dated Sep. 15, 2015 (7 pages).

* cited by examiner

SIGNAL DISCRIMINATION FOR WIRELESS KEY FOBS AND INTERACTING SYSTEMS

BACKGROUND

The present invention relates to control systems for wireless electrical charging units.

Wireless charging systems have been developed for automotive environments, e.g. for recharging batteries on devices such as cell phones, laptop computers, and flashlights. However, such systems can interfere with signaling required for other vehicle systems such as fobs for remote entry and vehicle starting.

SUMMARY

Remote-based systems on vehicles such as remote entry or starting systems generally include a remote device, hereinafter referred to as a fob, which is in communication with a particular vehicle. These systems operate on the premise that the vehicle transmits a vehicle control signal when: (1) the receiving key fob comes into close proximity to the car, (2) the door opens, or (3) the vehicle start button is pushed. The key fob itself is a signal receiver that is tuned to the transmitted signal of the car. In general, the vehicle control system transmits a signal that is received by the key fob and the key fob sends back a signal to confirm receipt of the signal from the vehicle. In some instances, the key fob may initiate communications by transmitting a signal to the vehicle, e.g. to unlock the doors of the vehicle or to start the engine. Although the discussion herein focuses on vehicle control signals involved in keyless ignition, the basic principles apply to other uses of a wireless key fob such as locking or unlocking of vehicle doors.

In general, the vehicle control and key fob signals are comparatively weak compared to the signal from a wireless charger. The wireless charge signal is also relatively close to the vehicle signal and the tuned frequency that the key fob is set up to receive. As such the key fob picks up an induced signal from the wireless charger that effectively overpowers the ability of the key fob system to continue to process the needed signal and allow for proper vehicle operation.

To prevent the wireless charge frequency from inducing this overpowering signal, a means must be developed to detect the operation of both systems but preferentially shut down the wireless charger for as short a time period as possible. In this way vehicle operations are maintained while wireless power charging time is maximized.

Thus, in one embodiment, the invention provides a wireless charging system for a vehicle. The system includes a wireless power transmitter, a detector device associated with the wireless power transmitter, and a controller operatively associated with the wireless power transmitter. The controller senses whether a vehicle control signal is present using the detector device, stops transmission of electromagnetic energy from the wireless power transmitter to a receiving device if a vehicle control signal is present, and resumes transmission of electromagnetic energy from the wireless power transmitter to the receiving device after a predetermined period of time.

In another embodiment the invention provides a method of controlling a wireless charging system in a vehicle. The method includes steps of sensing whether a vehicle control signal is present using a detector device associated with a wireless power transmitter; stopping transmission of electromagnetic energy from the wireless power transmitter to the receiving device if a vehicle control signal is present; and resuming transmission of electromagnetic energy from the wireless power transmitter to the receiving device after a predetermined period of time.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
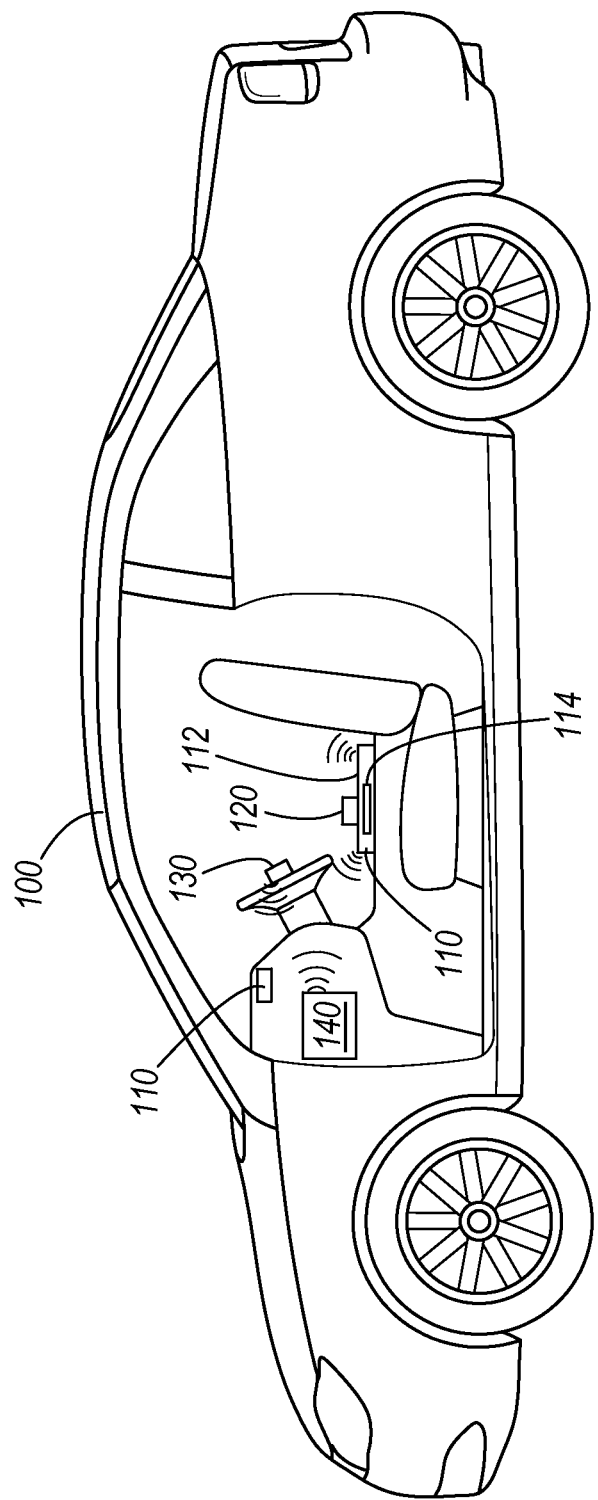
FIG. 1 shows a vehicle with a wireless charging system.

Some vehicles 100 are now being provided with wireless charging systems 110 to recharge a receiving device 120, i.e. portable electronic devices which have rechargeable batteries such as cell phones, laptop computers, tablet computers, or flashlights (FIG. 1). Wireless charging systems 110, which may be original equipment or an aftermarket add-on to the vehicle 100, generally include a charging surface 112 having a coil 114 embedded thereunder to facilitate inductive charging of the receiving device 120, where the receiving device 120 itself has a coil that is designed to receive the electromagnetic energy emitted from the coil 114 of the wireless charging system 110. The charging surface 112, which may be a pad or tray, may be mounted on the vehicle's dashboard, on the console between the front and/or rear seats, on an armrest, in a glove box, or in any other location within the vehicle (FIG. 1).

Many vehicles 100 are also provided with key fobs 130 or other devices that provide wireless keyless entry and ignition systems (FIG. 1). Such vehicles include a vehicle control system 140 which communicates with the key fob 130 to activate the keyless entry and keyless ignition systems. In some vehicles 100, the vehicle control system 140 detects when the fob 130 is in the proximity of the vehicle 100 and either unlocks the doors automatically or unlocks the door when a sensor on or near a door handle is touched while the key fob 130 is near the exterior of the vehicle. When the key fob 130 is in the interior of the vehicle 100 (i.e. when the driver gets into the vehicle while holding the key fob), the vehicle control system 140 then permits the keyless ignition system to operate, e.g. starts the vehicle's engine when a button is pressed, provided the key fob 130 is inside the vehicle 100.

In general, the key fob 130 includes an electronic identification circuit as well as an antenna and transmitter for communicating with the vehicle control system 140. The key fob 130 may have an internal battery to facilitate operation of the identification circuit and communications with the vehicle control system 140, or the key fob 130 may have no internal power source and instead rely on capturing energy from the communications signals of the vehicle control system 140 to power the key fob 130 during its brief communications with the vehicle control system 140.

A potential problem with introducing a wireless charging system 110 into an automotive environment is that the electromagnetic energy emitted by the wireless charging system 110 to transfer power to the receiving device 120 can also interfere with the operation of critical systems in the vehicle 100 such as the keyless remote entry system or ignition system described above.

Accordingly, the present invention provides methods and systems for controlling a wireless charging system in a vehicle in order to eliminate interference between the wireless charging system and the vehicle control system.

In one embodiment, a wireless charging system for a vehicle includes a wireless power transmitter, a detector device associated with the wireless power transmitter, a receiving device, and a controller associated with the wireless power transmitter. In various embodiments, the controller is configured to transmit electromagnetic energy from the wireless power transmitter to the receiving device and to sense whether a vehicle control signal is present using the detector device. If the controller detects that a vehicle control signal is present, the controller stops transmission of electromagnetic energy from the wireless power transmitter to the receiving device and, after a predetermined period of time, resumes transmission of electromagnetic energy from the wireless power transmitter to the receiving device.

In some embodiments, to sense whether a vehicle control signal is present, the controller may be configured to measure an electromagnetic signal within the vehicle, identify at least one signal component within the electromagnetic signal, and determine whether the at least one signal component includes the vehicle control signal.

Figure 2:
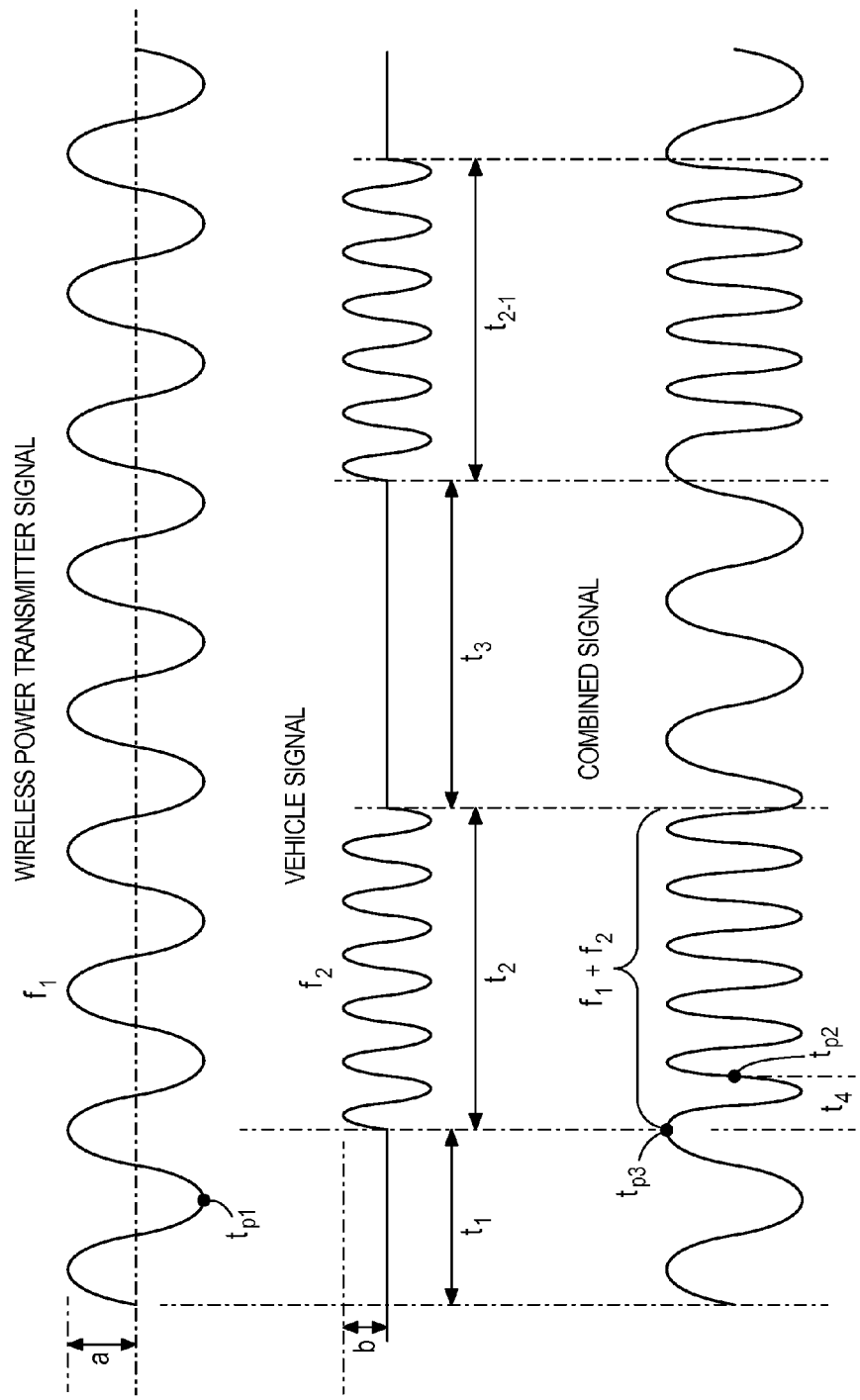
FIG. 2 shows a series of electromagnetic signals of the type that would be measured by a detector device of a wireless charging system.

For example, FIG. 2 shows a series of electromagnetic signals of the type that the detector device would measure. The top row of FIG. 2 shows a typical signal that would be emitted by the wireless power transmitter, which is depicted as a continuous sinusoidal signal with a frequency $f_1$ and an amplitude 'a.' The middle row of FIG. 2 shows a typical signal that would be emitted by the vehicle control system, which is depicted as an intermittent sinusoidal signal having a frequency $f_2$ and an amplitude 'b.' The vehicle control signal duration may be as brief as a few tens to a few hundreds of milliseconds and the frequency may be in the range of 90-150 kHz. The bottom row of FIG. 2 shows the combination of signals (labeled $f_1+f_2$) from the wireless power transmitter plus the vehicle control system, which would be measured by the detector device when the vehicle control system is active at the same time as the wireless power transmitter. In the example shown in FIG. 2, during periods $t_1$ and $t_3$ there is only a signal from the wireless power transmitter whereas during periods $t_2$ and $t_{2-1}$ there are signals from both the wireless power transmitter and the vehicle control system. The combined signals during periods $t_2$ and $t_{2-1}$ may not be the same because the signals from the wireless power transmitter and the vehicle control system may have a different phase from one another in period $t_2$ compared to period $t_{2-1}$.

Figure 4:
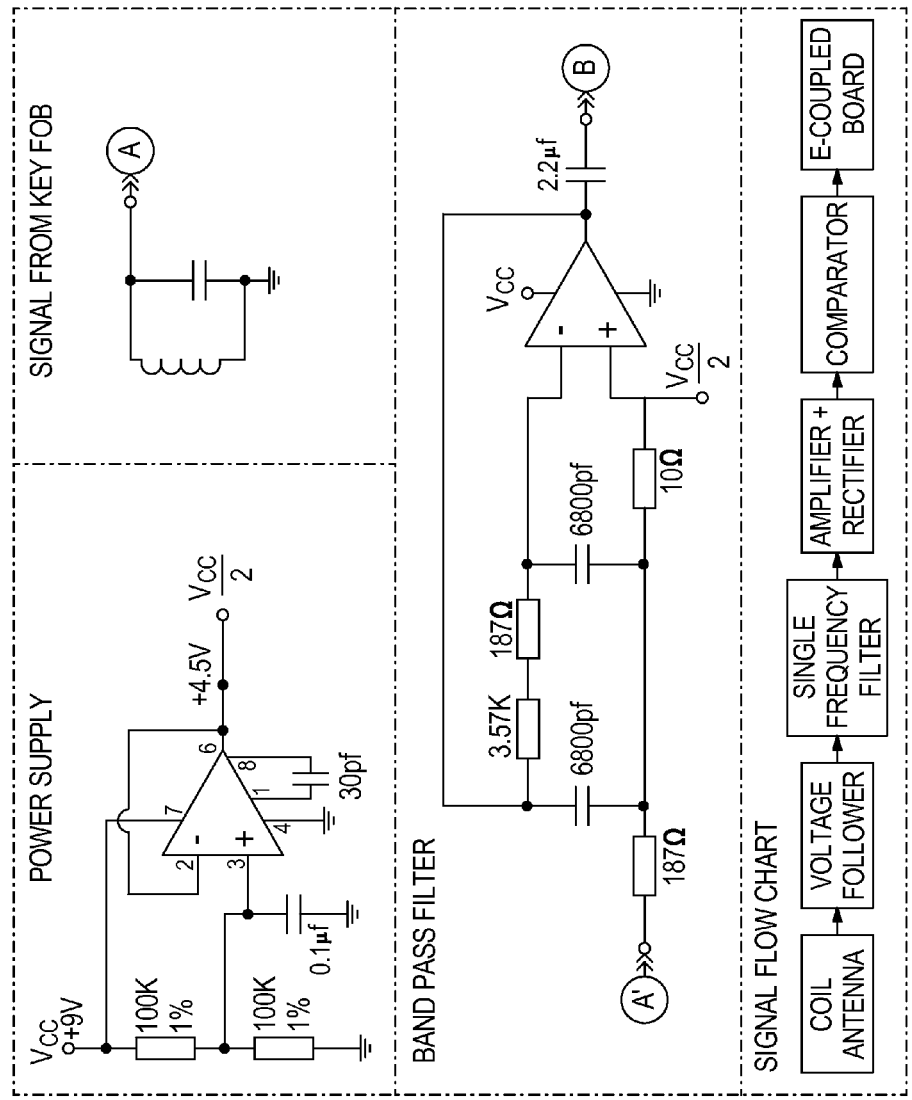
FIGS. 4 and 5 show components of a circuit for determining whether a key fob signal and/or vehicle control signal is being transmitted.
Figure 5:
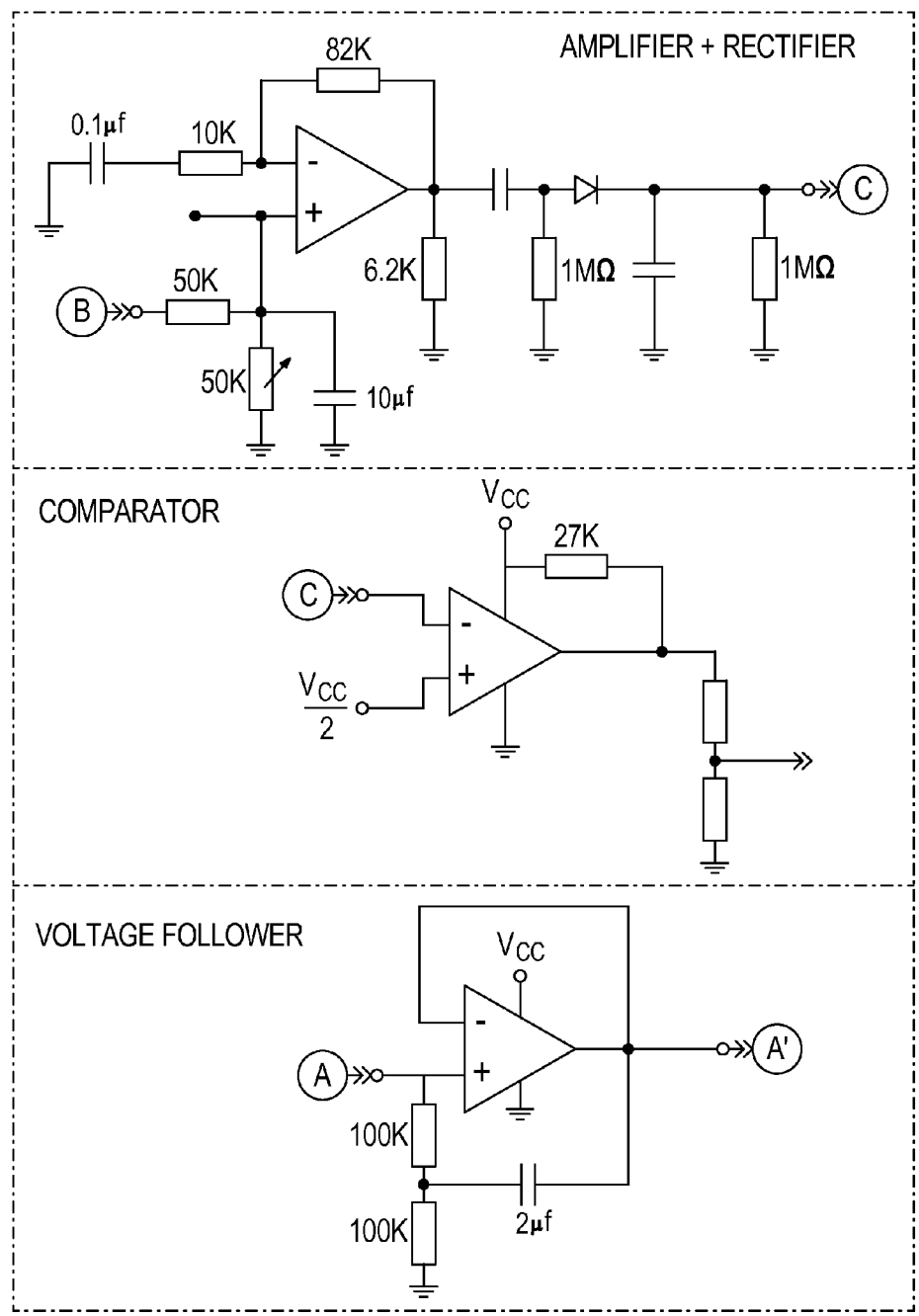

To determine whether the vehicle control system is sending signals at any given time, it is necessary to dissect a signal such as that shown in the bottom row of FIG. 2 to identify the individual signal components. In one embodiment, this is done by inputting the signal from the detector device into a circuit that is tuned to a frequency corresponding to a frequency of the signals from the vehicle control system and/or key fob so as to identify when a signal of that particular frequency (or range of frequencies) is present in the measured signal (FIGS. 4, 5). In another embodiment, the signal from the detector device is digitized and analyzed using a software routine which separates the signal into component frequencies (e.g. by transforming the data into the frequency domain and analyzing the frequency spectrum) and identifies one or more components corresponding to the vehicle control signal. In the example shown in FIG. 2, the signal from the wireless power transmitter may be detected at point $t_{p1}$. The detection point $t_{p2}$ of the vehicle control signal, on the other hand, may be at a time period $t_4$ representing a lag time starting from the time that $f_1$ and $f_2$ start to combine at point $t_{p3}$.

While the signals from the wireless power transmitter are shown in FIG. 2 as having a regular sinusoidal pattern with a single frequency, in some embodiments this signal might not have a fixed frequency and also might have a pattern other than sinusoidal. In this case, a reference signal (e.g. provided as an output from the wireless power transmitter) can be provided in order to facilitate identification of the component corresponding to the wireless power transmitter. In one embodiment, using the reference signal the signal component from the wireless power transmitter can be subtracted (either using a circuit or using a software-based algorithm) from the combined signal as measured by the detector device in order to identify the vehicle control signal.

Once it has been determined that the vehicle control system is attempting to communicate with the fob, the wireless power transmitter is stopped for a predetermined amount of time. The amount of time is typically on the order of a few seconds, e.g. 2-5 seconds, and is determined by the period of time that may be needed for the vehicle control system to complete operation, for example of starting the ignition of the vehicle.

The wireless power transmitter can be stopped in several different ways. Power to the wireless power transmitter can be discontinued by either stopping the power feed to a microprocessor controlling the wireless charging system or by directly stopping the main power supply to the wireless charging system, or alternatively by sending a signal to the wireless power transmitter which in turn, using internal control logic, turns off the output power transmission.

Figure 3:
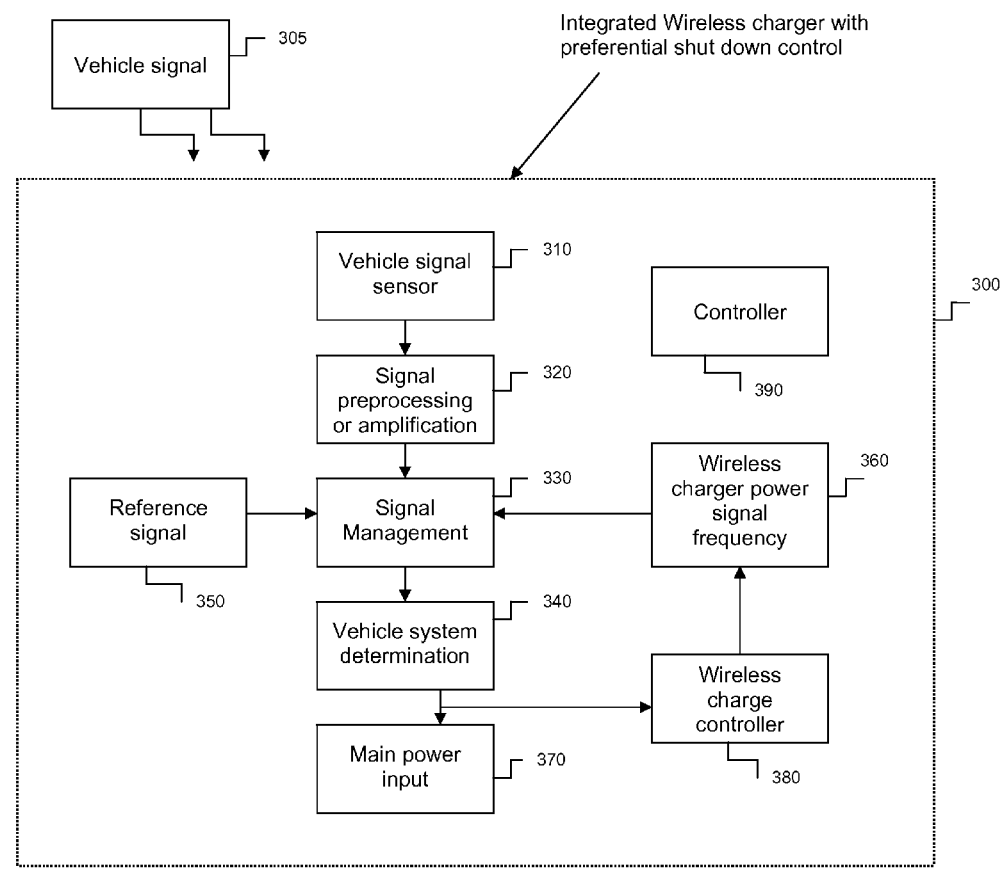
FIG. 3 shows a block diagram of a wireless charging system.

FIG. 3 shows a block diagram of an embodiment of a wireless charging system 300. The system 300 includes a vehicle signal sensor 310, which measures a vehicle control signal 305 and sends it to a signal preprocessing/amplification module 320. The signal preprocessing/amplification module 320 in turn transmits the signal to a signal management module 330. The signal management module 330 sends one or more signals to a vehicle system determination module 340, which may employ a tuned circuit (FIGS. 4, 5) or a software routine for identifying particular components of a received vehicle control signal and/or of wireless charging system to determine if the vehicle control signal 305 is active. The signal management module 330 includes as additional inputs a reference signal 350 and a wireless charger power signal frequency signal 360. If the vehicle system determination module 340 determines that the vehicle control signal 305 is active, then the vehicle system determination module 340 stops wireless charging for a predetermined amount of time by controlling one or both of a main power input 370 and a wireless charge controller 380. The modules of the wireless charging system are controlled by a controller 390, which includes a microprocessor, memory and data storage, and input and output capabilities. In addition, each module may include its own local controller.

In some embodiments, the wireless charging system 300, including the vehicle signal sensor 310 (or detector device), is provided in a housing. In one embodiment, the signal sensor 310 is located on a printed circuit board along with other components of the wireless charging system. In various embodiments, the housing includes shielding on one or more sides to minimize reception of the wireless charging signals by the vehicle signal sensor 310. In one particular embodiment, the transmitter coil of the wireless charging system 300 is shielded and the vehicle signal sensor 310 is located below the shielding of the transmitter coil of the wireless power transmitter. In still other embodiments, the vehicle signal sensor 310 includes one or more (e.g. two- or three-axis) directional antennas arranged to maximize reception of vehicle control signals 305 and to further limit the amount of wireless charging signal that is detected, thereby enhancing detection of the vehicle control signals 305.

In various embodiments, the invention includes a method of controlling a wireless charging system in a vehicle. In particular embodiments, one or more steps of the method are carried out by a microprocessor associated with the controller of the wireless power transmitter.

Figure 6:
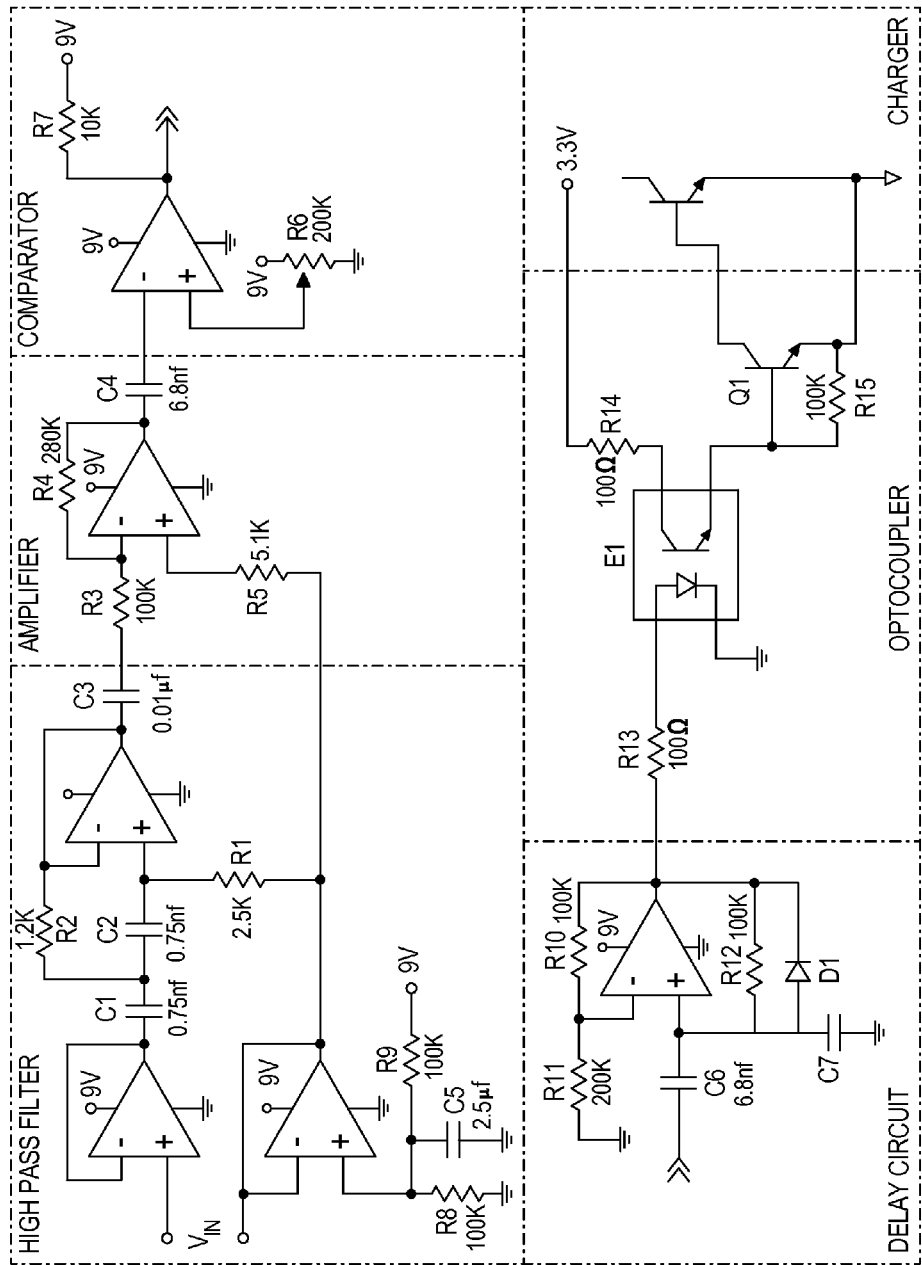
FIG. 6 shows components of a circuit for determining whether a key fob signal and/or vehicle control signal is being transmitted.

Another embodiment of a circuit for detecting a signal from a key fob or a vehicle control system is shown in FIG. 6. In one particular embodiment, the key fob receiving coil can be integrated into the wireless charging system adjacent to and aligned with a charging coil. For example, the components of the wireless charging system can include, from top to bottom: the charging coil having a ferrite plate; a copper plate (e.g. 0.74 mm thick) which is slightly bigger than the ferrite plate (e.g. may protrude by 5 mm on each side); a controller or other circuit board; and the key fob receiving coil, which is in approximate alignment with the charging coil. In one embodiment, the key fob receiving coil is a three-axis transponder inductor from Premo (Spain), model no. 3DC1515, although other suitable coil components can also be used.

In one embodiment, the input $V_{in}$ of the circuit of FIG. 6 is obtained from a key fob receiving coil (i.e. a receiving coil for detecting key fob signals) that has been integrated into a wireless charging system. The signal first goes through a high pass filter, then an amplifier, and then a comparator. In one embodiment the high pass filter has a cutoff frequency of approximately 118 kHz, although other frequencies are also possible. The output of the comparator then triggers a monostable flip-flop (labeled "delay circuit" in FIG. 6) if activity of the vehicle control system is detected. In one embodiment, the wireless charging system emits a signal with a frequency of 110 kHz while the vehicle control system emits a signal with a 125 kHz frequency. The signal from the key fob receiving coil is compared in the comparator to a reference signal, e.g. a 110 kHz signal (shown in FIG. 6 as the adjustable voltage divider R6), in order to determine whether the vehicle control system is generating signals. While the 110 kHz signal generated by the wireless charging system will not exceed the reference signal level, the composite signal that is detected by the key fob receiving coil when both the wireless charging system and the vehicle control system are in operation will exceed the reference signal level and as a result will trigger the monostable flip-flop. Upon activation of the monostable flip-flop, the output is fed through an optical coupler (to prevent a direct electrical connection to the wireless power transmitter) to a switch which shuts off the charging circuit (FIG. 6). When triggered, the monostable flip-flop provides a 'lockout' for several seconds (e.g. 3-10 seconds), which generally locks out the wireless charging system for the remainder of the key fob interrogation cycle.

In general, there is a delay from the time that the vehicle control system begins signaling until the monostable flip-flop is triggered (i.e. the key fob receiving coil detects the vehicle control system signals) and an additional delay until the transmission coil in the wireless charging system stops transmitting energy. Assuming the vehicle control system signals are transmitted for only brief periods of time, it is important to minimize the delay times so that the wireless charging system is shut off as quickly as possible. If the wireless charging system is not turned off soon enough, the vehicle control system signals (e.g. to or from the key fob) may end before an action (e.g. starting the vehicle) is completed. Thus, to reduce the amount of time it takes for the magnetic field to collapse, and hence the amount of time needed to eliminate energy emanating from the wireless charging system, the transmitter coil of the wireless charging system can be shorted with a resistor (which may have a value of zero ohms).

Figure 7A:
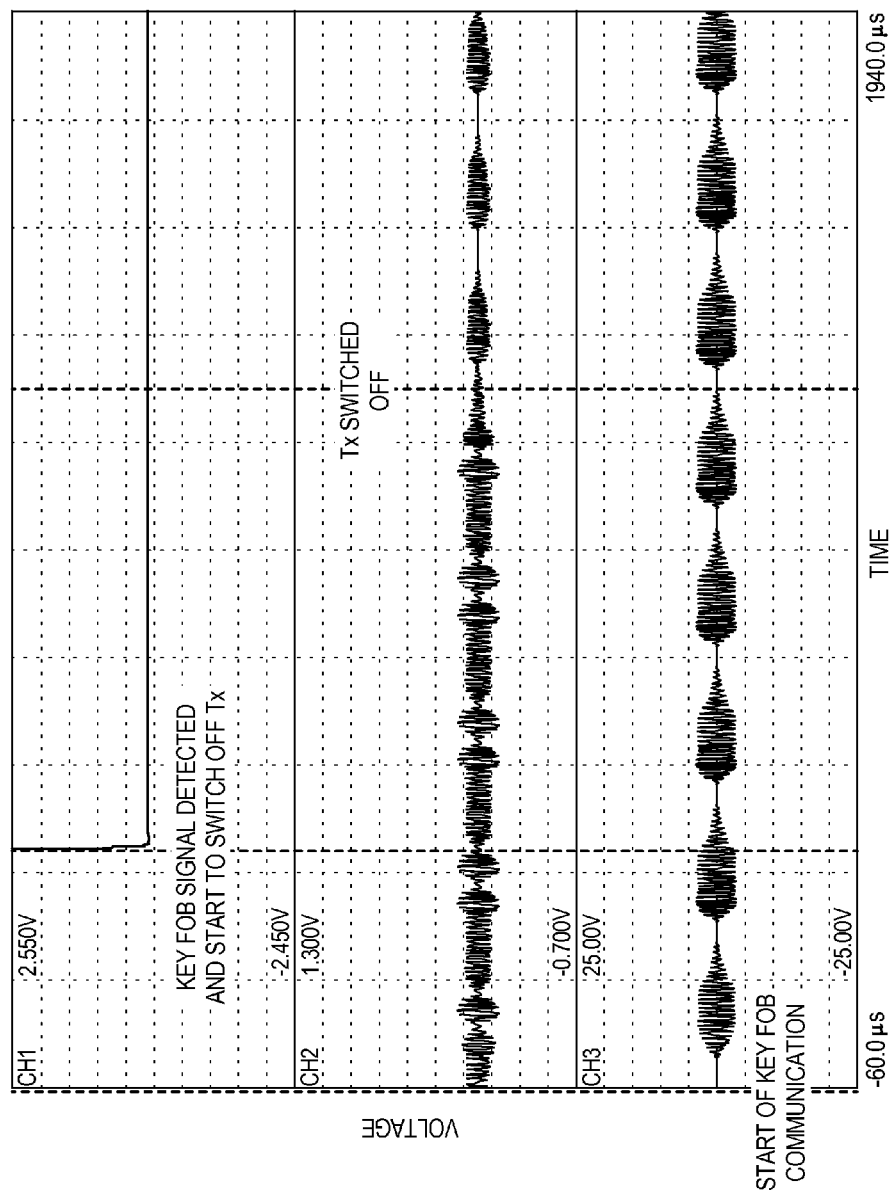
FIGS. 7A-7C show oscilloscope traces from a wireless charging system with a vehicle control signal detection mechanism.
Figure 7B:
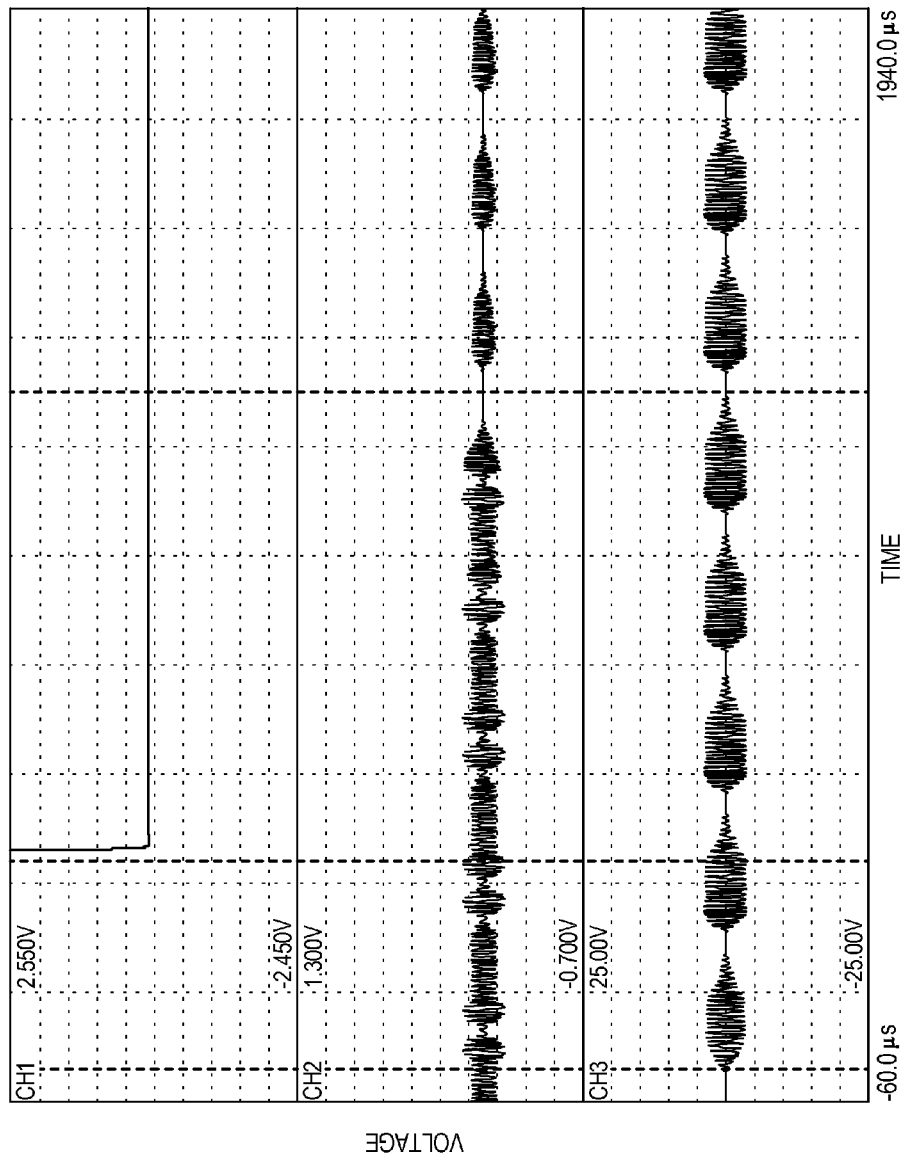
Figure 7C:
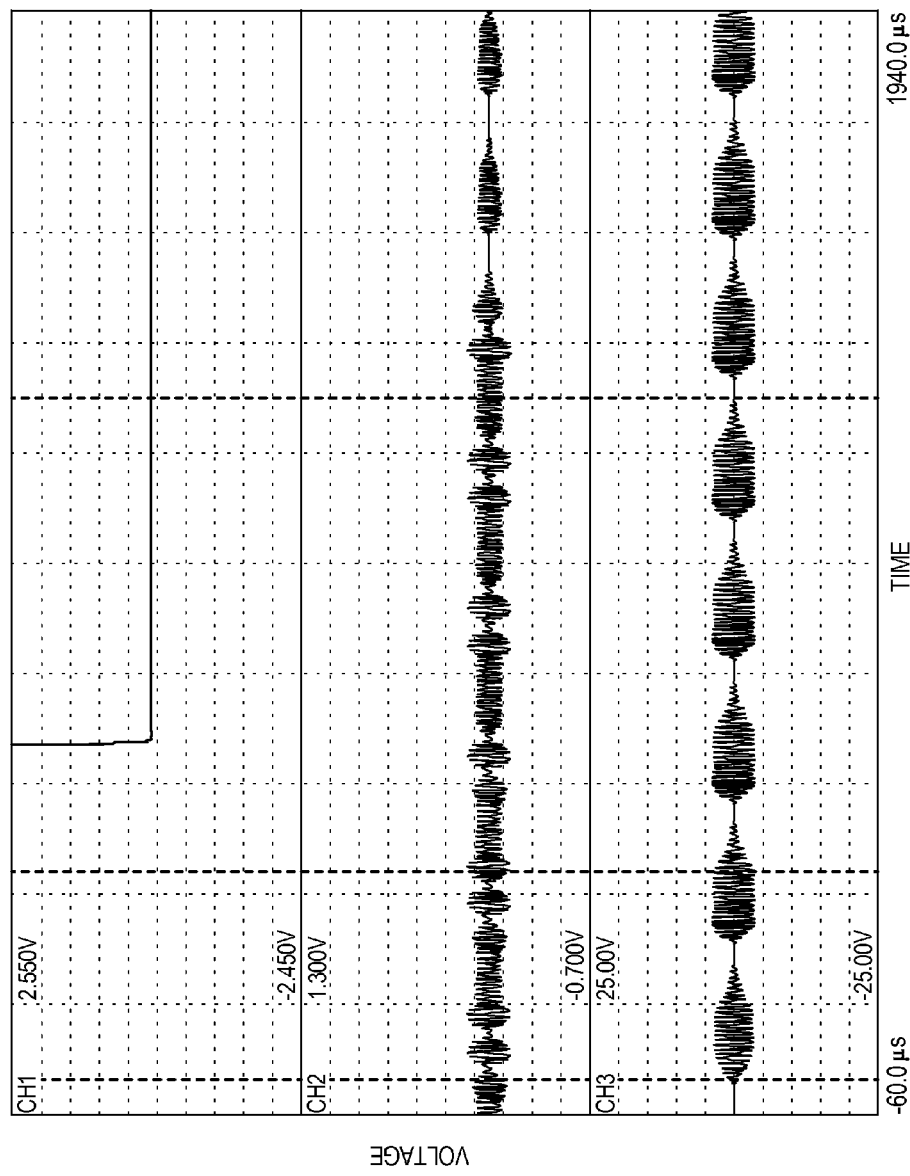
Figure 8A:
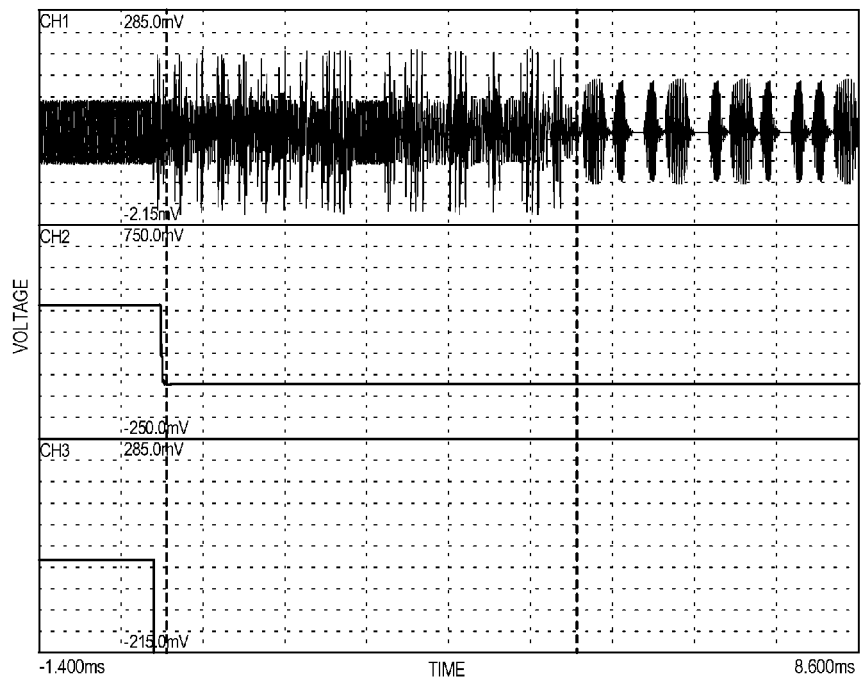
FIGS. 8A-8F show oscilloscope traces from a wireless charging system with a vehicle control signal detection mechanism.
Figure 8B:
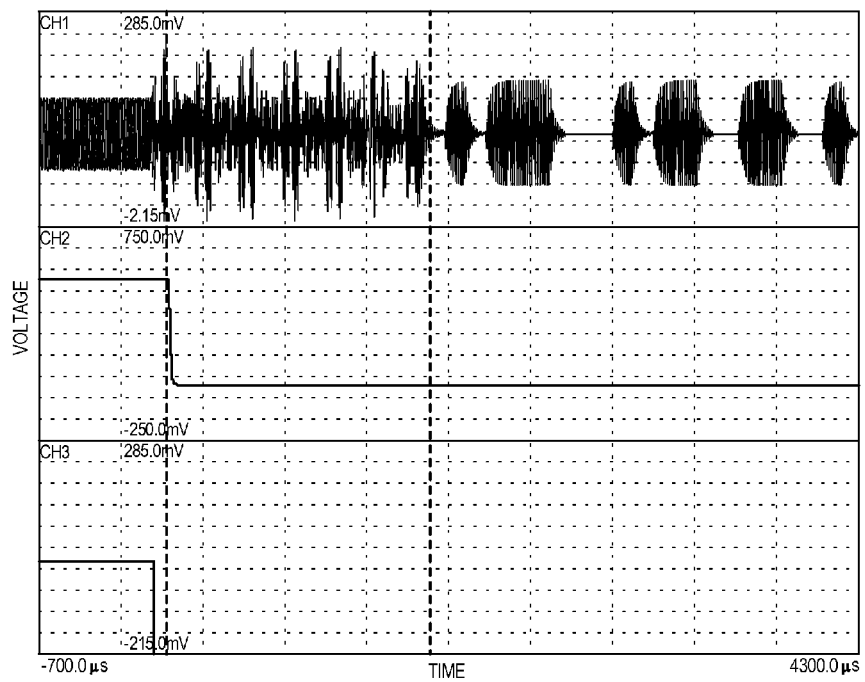
Figure 8C:
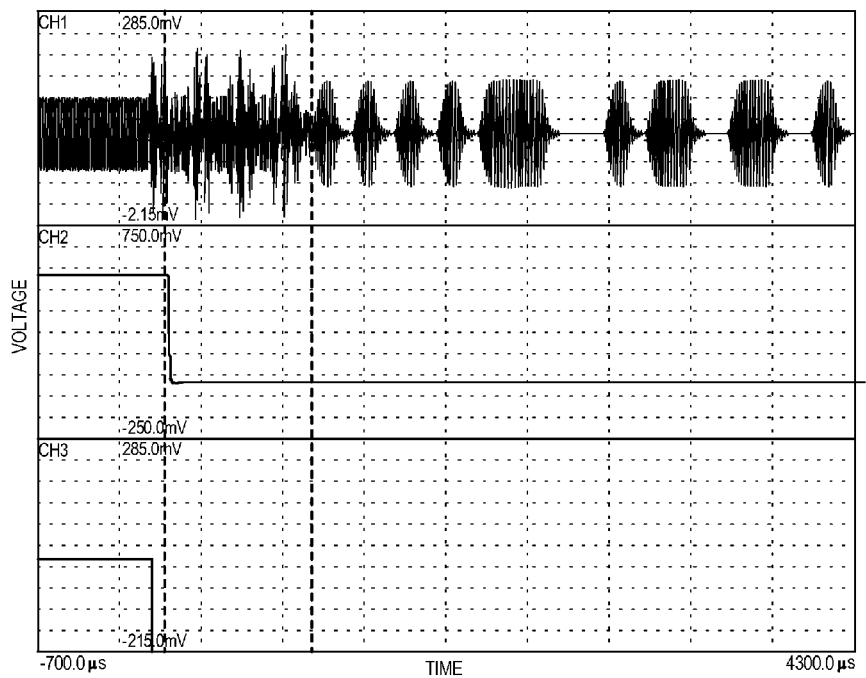
Figure 8D:
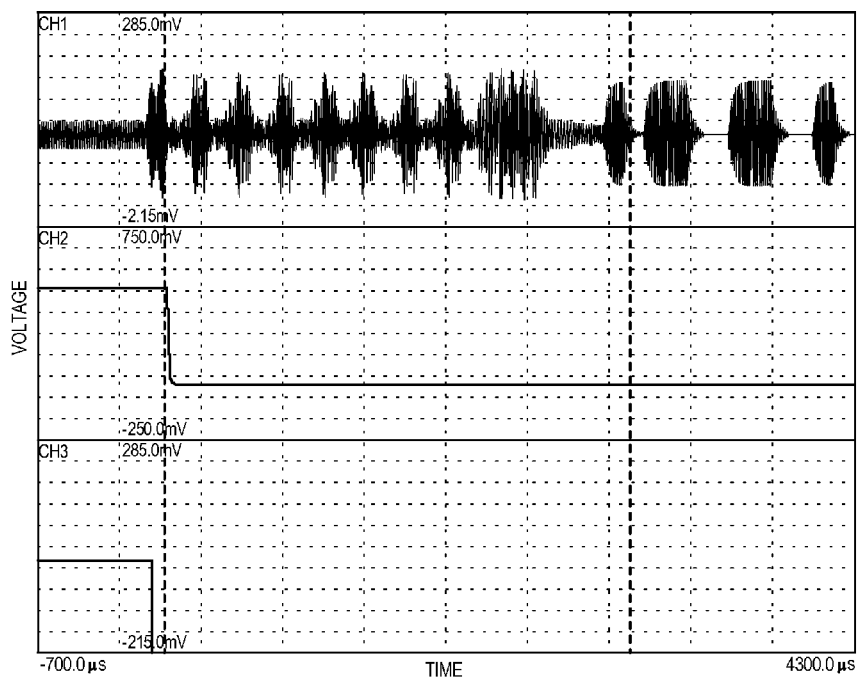
Figure 8E:
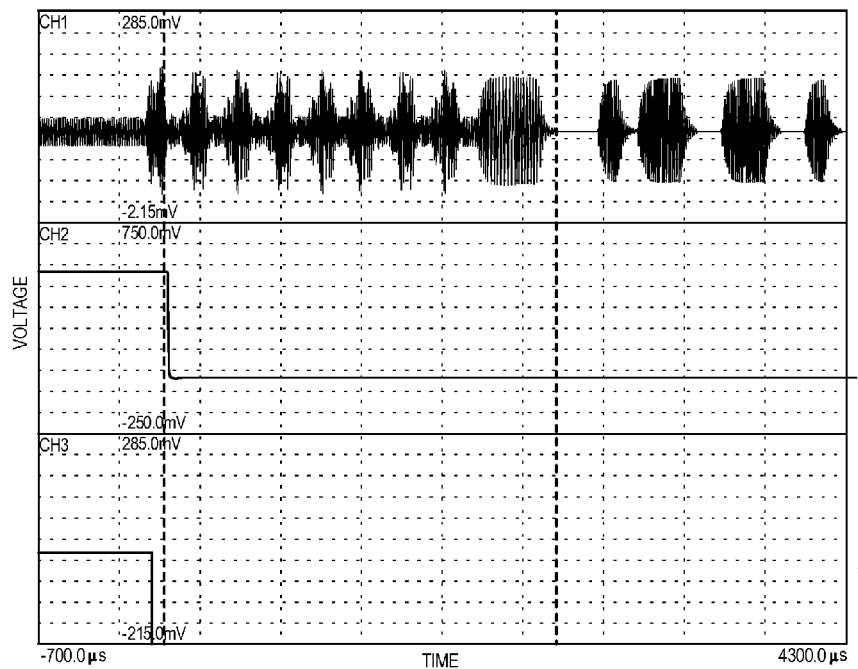
Figure 8F:
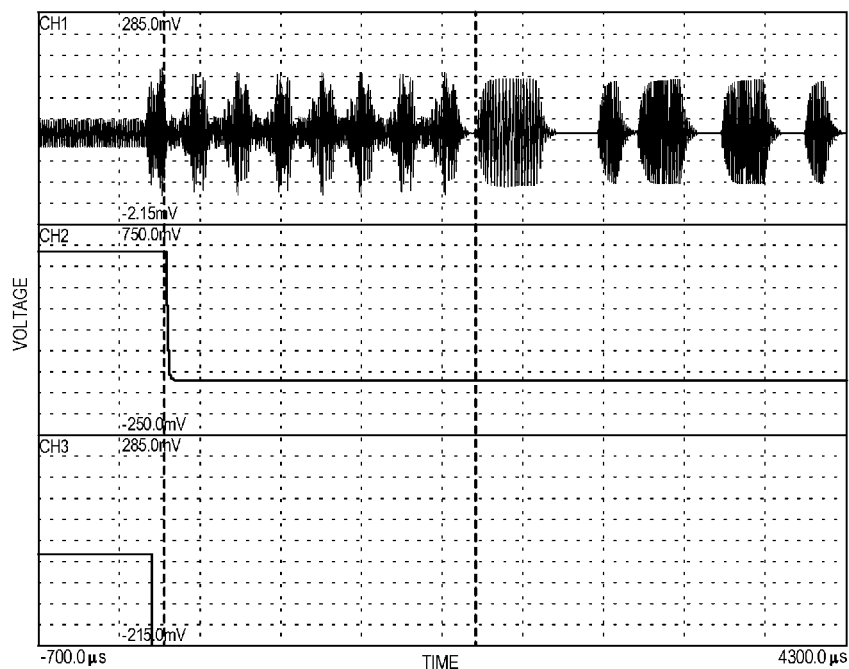

FIGS. 7A-7C show oscilloscope traces from one embodiment of a wireless charging system with a vehicle control signal detection mechanism. In each of FIGS. 7A-7C, the top portion (CH1) corresponds to the output of the monostable flip-flop, the middle portion (CH2) corresponds to the signal from the key fob receiving coil, and the bottom portion (CH3) is a signal from a key fob receiving coil mounted in a position remote from the wireless charging system, where the remotely-mounted key fob receiving coil is used as a reference to monitor the signals from the vehicle control system independent of the signals from the wireless charging system.

As labeled in FIG. 7A, the left-hand portion of each trace corresponds to the start of signaling from the vehicle control system (labeled "start of key fob communication"). The next phase is the detection of the key fob signals, as indicated by the stepwise decrease in the CH1 signal from the monostable flip-flop. Finally, the transmission coil of the wireless charging system is deactivated and stops transmitting, as can be seen when the latter portions of CH2 resemble the CH3 signals which correspond to the vehicle control system signals alone.

FIGS. 8A-8F show oscilloscope traces from an embodiment of a wireless charging system with a vehicle control signal detection mechanism. In each of FIGS. 8A-8F, the top portion (CH1) corresponds to the signal from the key fob receiving coil, the middle portion (CH2) corresponds to the signal controlling the transmission coil of the wireless charging system, and the bottom portion (CH3) corresponds to the output of the monostable flip-flop. The vertical dashed lines in each trace indicate when power to the transmission coil of the wireless charging system is shut off (left-hand vertical dashed line) and when signals from the coil cease (right-hand vertical dashed line). In the embodiment of FIGS. 8A-8F, it took about 100 microseconds to detect the vehicle control signal, whereas the time until complete cessation of signals from the coil of the wireless charging system varied from about 900 microseconds to about 5 milliseconds. The variability correlated to the load on the receiver (i.e. a receiving device such as a rechargeable battery in a cell phone or other device), where a 5 watt load on the receiver led to the shortest time (about 900 microseconds) until complete cessation of signals from the coil of the wireless charging system while the longest time (about 5 milliseconds) was observed when there was no load on the receiver. Without being limited by theory, it may be that a receiver with a higher load absorbs the signal from the transmission coil and thus helps the magnetic field collapse more quickly. Thus, in various embodiments, the transmission coil is shorted when the vehicle control signal is detected in order to facilitate a more rapid collapse of the magnetic field.

Thus, the invention provides, among other things, a method and system for controlling a wireless charging system in a vehicle. Various features and advantages of the invention are set forth in the following claims.

What is claimed is:

1. A method of controlling a wireless charging system in a vehicle, comprising:
    starting a wireless transmission of electromagnetic energy from a wireless power transmitter to a receiving device;
    detecting a vehicle control signal using a detector device associated with the wireless power transmitter during the wireless transmission of electromagnetic energy from the wireless power transmitter to the receiving device;
    stopping the wireless transmission of electromagnetic energy from the wireless power transmitter to the receiving device upon detection of the vehicle control signal; and
    resuming the wireless transmission of electromagnetic energy from the wireless power transmitter to the receiving device after a predetermined period of time following the detection of the vehicle control signal.

2. The method of claim 1, wherein sensing whether a vehicle control signal is present comprises
    measuring an electromagnetic signal within the vehicle,
    identifying at least one signal component within the electromagnetic signal, and
    determining whether the at least one signal component includes the vehicle control signal.

3. The method of claim 2, wherein identifying at least one signal component within the electromagnetic signal comprises inputting the electromagnetic signal into a circuit tuned to a frequency corresponding to a frequency of the vehicle control signal.

4. The method of claim 2, wherein identifying at least one signal component within the electromagnetic signal comprises digitizing the electromagnetic signal and analyzing the digitized electromagnetic signal to identify a frequency corresponding to a frequency of the vehicle control signal.

5. The method of claim 1, wherein the receiving device is selected from the group consisting of a cell phone, a laptop computer, a tablet computer, and a flashlight.

6. The method of claim 1, wherein transmitting electromagnetic energy from a wireless power transmitter to a receiving device comprises transmitting electromagnetic energy from a wireless power transmitter to a receiving device using inductive coupling.

7. The method of claim 1, wherein the detector device comprises a directional antenna.

8. The method of claim 1, wherein the vehicle control signal is generated by at least one of a key fob and a vehicle control system.

9. The method of claim 1, wherein the wireless power transmitter is located within a housing and wherein the detector device is located within the housing.

10. The method of claim 9, wherein the housing includes shielding on at least one side, such that sensing whether a vehicle control signal is present using a detector device associated with the wireless power transmitter comprises sensing whether a vehicle control signal is present in a direction away from the shielding.

11. A wireless charging system for a vehicle, comprising:
    a wireless power transmitter;
    a detector device associated with the wireless power transmitter; and
    a controller operatively associated with the wireless power transmitter that
        starts a wireless transmission of electromagnetic energy from the wireless power transmitter to a receiving device,
        detects a vehicle control signal using the detector device during the wireless transmission of electromagnetic energy from the wireless power transmitter to the receiving device,
        stops the wireless transmission of electromagnetic energy from the wireless power transmitter to the receiving device upon detection of the vehicle control signal, and
        resumes the wireless transmission of electromagnetic energy from the wireless power transmitter to the receiving device after a predetermined period of time following the detection of the vehicle control signal.

12. The system of claim 11, wherein the controller
    measures an electromagnetic signal within the vehicle,
    identifies at least one signal component within the electromagnetic signal, and
    determines whether the at least one signal component includes the vehicle control signal.

13. The system of claim 12, wherein the controller inputs the electromagnetic signal into a circuit tuned to a frequency corresponding to a frequency of the vehicle control signal.

14. The system of claim 12, wherein the controller digitizes the electromagnetic signal and analyzes the digitized electromagnetic signal to identify a frequency corresponding to a frequency of the vehicle control signal.

15. The system of claim 11, wherein the receiving device is selected from the group consisting of a cell phone, a laptop computer, a tablet computer, and a flashlight.

16. The system of claim 11, wherein the controller transmits electromagnetic energy from a wireless power transmitter to a receiving device using inductive coupling.

17. The system of claim 11, wherein the detector device comprises a directional antenna.

18. The system of claim 11, wherein the vehicle control signal is generated by at least one of a key fob and a vehicle control system.

19. The system of claim 11, wherein the wireless power transmitter is located within a housing and wherein the detector device is located within the housing.

20. The system of claim 19, wherein the housing includes shielding on at least one side, such that the controller, in order to sense whether a vehicle control signal is present using a detector device associated with the wireless power transmitter, is further configured to sense whether a vehicle control signal is present in a direction away from the shielding.

* * * * *